United States Patent [19]

Beasley

[11] Patent Number: 5,657,716
[45] Date of Patent: Aug. 19, 1997

[54] SIGNALING DEVICE FOR A DOCK LEVELER SYSTEM

[75] Inventor: Gary Beasley, Van Buren, Ark.

[73] Assignee: Dock Leveler Manufacturing, Malvern, Ark.

[21] Appl. No.: 566,971

[22] Filed: Dec. 4, 1995

[51] Int. Cl.⁶ ........................... G09F 9/00
[52] U.S. Cl. ............ 116/303; 116/215; 14/69.5
[58] Field of Search .................. 116/284, 296, 116/297, 300, 303, 305, 215; 14/69.5, 71.1, 71.3, 71.7

[56] References Cited

U.S. PATENT DOCUMENTS

| | | |
|---|---|---|
| 2,639,450 | 5/1953 | Ramer ........................ 14/71.7 |
| 2,718,867 | 9/1955 | Ray ........................... 116/215 |
| 2,941,496 | 6/1960 | Leischer ..................... 116/298 |
| 3,475,778 | 11/1969 | Merrick et al. ............. 14/71.3 |
| 5,117,526 | 6/1992 | Alexander ................... 14/71.7 |
| 5,457,838 | 10/1995 | Gelder et al. ............... 14/69.5 |

*Primary Examiner*—William A. Cuchlinski, Jr.
*Assistant Examiner*—Andrew Hirshfeld
*Attorney, Agent, or Firm*—Samuels, Gauthier, Stevens & Reppert

[57] ABSTRACT

A signaling system includes a rotatable arm connected to a dock. One end of the arm has secured thereto two signaling paddles of distinct visual indicia. The other end of the arm is biased against the underside of a lip plate of a dock loader. As the lip plate is pivoted relative to the dock, the arm is rotated, thus rotating the signaling paddles attached thereto.

7 Claims, 2 Drawing Sheets

SIGNALING DEVICE FOR A DOCK LEVELER SYSTEM

BACKGROUND AND BRIEF SUMMARY OF THE INVENTION

In the shipment of cargo by tractor trailers and the like, cargo is typically loaded and unloaded at a dock. The trailer is backed into and abuts a pair of bumpers secured to the dock. The cargo is transferred between the trailer and the dock. Usually, fork lift trucks or similar vehicles are used to transfer the cargo.

The bumpers result in an opening or gap between the edge of the dock and the edge of the trailer. Also, the floor of the trailer is usually not level with the floor of the dock.

Dock levelers, such as manufactured by DLM, Inc. of Malvern, Ark., are used to provide a ramp to bridge the gap and to provide a 'level' surface whether or not there is a height difference. Dock levelers per se are well known in the field and can be pit-mounted or edge-of-dock (recessed or flush mounted) dock levelers. Whether pit-mounted or edge-mounted, there is a commonality in function. First, the dock levelers provide for a platform or ramp which both bridges the gap between the edge of the dock and the edge of the trailer and provides a flat, uniform surface for vehicular and pedestrian traffic between the dock and the inside of the trailer. Further, the dock levelers comprise articulated plates which move between an inoperative or recessed position when not in use and an operative or extended flat position when in use. Generally, dock levelers comprise a base plate to which is secured a hinged lip plate. When in the inoperative position, the lip plate hangs downwardly from the base plate. When moving to the operative position, the base plate moves upwardly and then downwardly as the lip plate extends outwardly. In the operative position, the lip plate bridges the gap between the floor of the trailer and the dock.

When a trailer is approaching or leaving a dock it is important that the driver know the position of the dock leveler.

It is particularly important that the driver know that prior to leaving a dock that the dock is in its inoperative position. Signaling devices have been used to indicate whether a dock leveler is in its operative or inoperative position to ensure that when a trailer is leaving the dock the dock leveler is in its inoperative position. This would indicate that there are no personnel or vehicles either in the trailer or just leaving the trailer as the trailer moves away from the dock.

Present state-of-the-art signaling devices are typically electronic and sense the position of the plates in the dock leveler and provide an output corresponding to the position to the plates in the dock leveler either in their operative or inoperative position.

The present invention embodies a signaling device which is mechanically linked to the movement of a plate(s) in a dock leveler to provide a visual signal corresponding to the position of the plate(s).

Broadly the invention comprises a signaling system which is mechanically joined to a dock leveler. An arm is rotatably secured within a support. One end of the arm engages the underside of a lip plate of the dock leveler. The other end of the arm has joined thereto two signal paddles of distinct visual indicia.

In the preferred embodiment of the invention, the signal paddles are fixed to the arm 90° apart. The arm is counter-balanced such that the one end of the arm is biased against the undersurface of the lip plate. When the lip plate moves from its inoperative (vertical) position to its operative (horizontal) position, the counter-balance causes the one end of the arm to travel on the underside of the lip plate while rotating the signal paddles through a path of 90°. The rotation of the paddles effectively moves one paddle (the GREEN GO paddle) out of view while moving the other paddle (the RED STOP paddle) in the view or line of sight of the driver of a tractor trailer. Conversely when the lip plate moves from its operative to its inoperative position the reverse of the just described motions occurs while the one end of the arm reverses its travel against the undersurface of the lip plate while being biased against the lip plate at all times by the counterweight.

DESCRIPTION OF THE PREFERRED EMBODIMENT(S)

Figure 1:
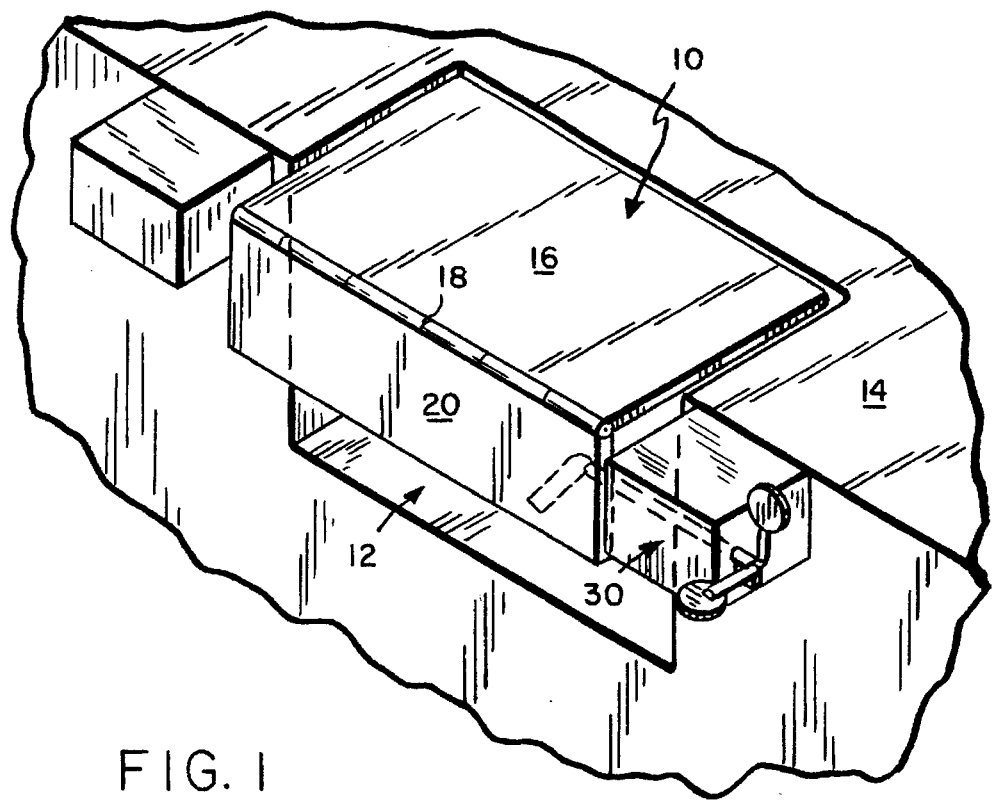
FIG. 1 is a schematic illustration of a signaling device of the invention.

Referring to FIG. 1, a pit-mounted dock leveler is shown generally at 10 mounted in a pit 12 of a dock 14. The pit-mounted dock leveler is shown schematically (associated controls and hydraulics not shown), the pit-mounted dock levelers per se being well known in the art. The dock leveler 10 comprises a support plate 16 having a leading edge 18 to which is hinged a lip plate 20. On either side of the pit are bumpers 22a and 22b.

Figure 2:
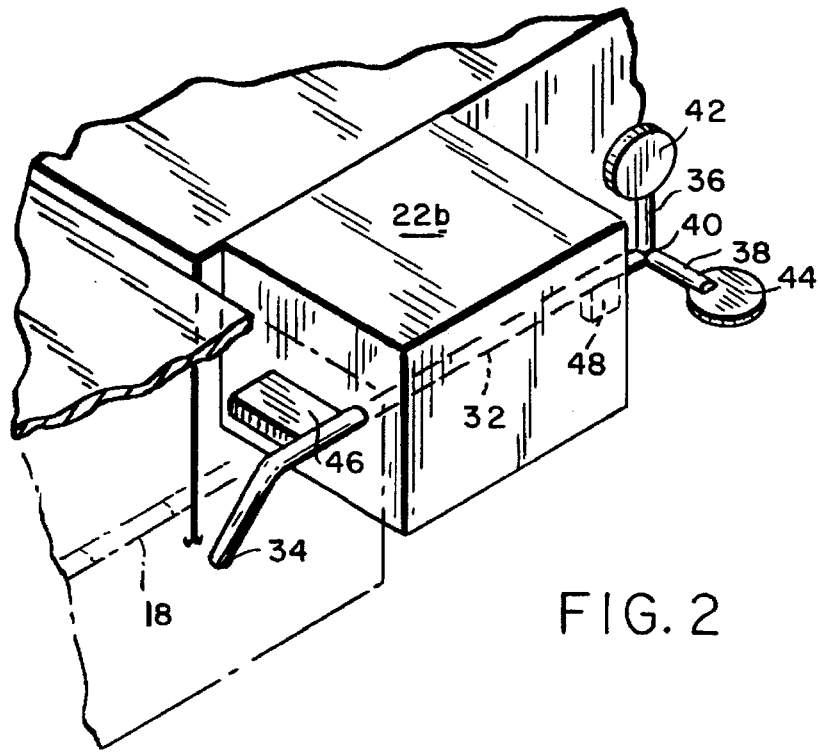
FIG. 2 is a partly sectional view of the signaling system of FIG. 1 with a lip plate in its inoperative position and a signal paddle displaying green.

A signaling system embodying the invention is shown generally at 30. As shown in FIGS. 1 and 2, the dock leveler system is in its inoperative position with the lip plate 20 depending downwardly from the plate 16.

Figure 3:
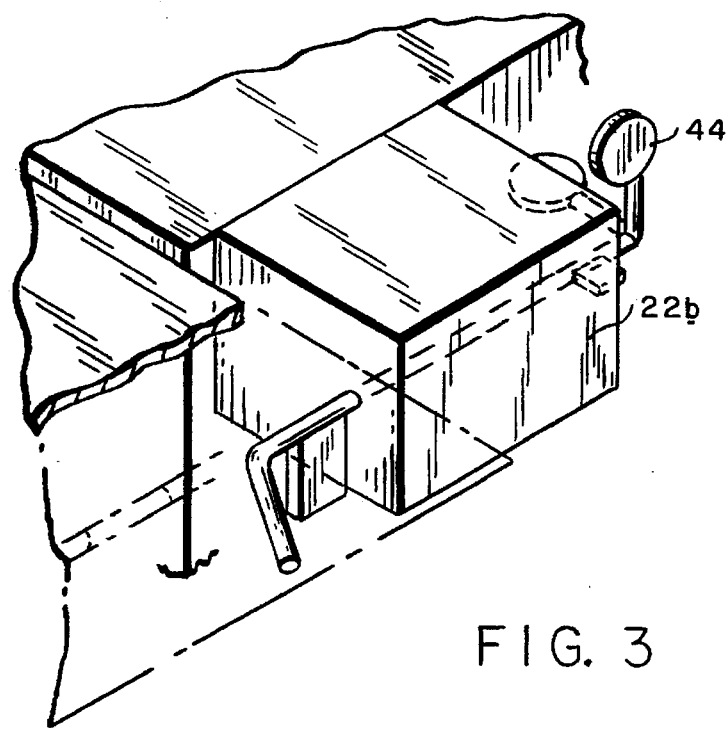
FIG. 3 is a sectional view of the signaling system of FIG. 1 with the lip plate in its operative position and a signal paddle displaying green stop.

Referring to FIGS. 2 and 3, rotatably passing through the bumper 22b is a signaling arm 32 angled at one end 34 and characterized by signal paddles 36 and 38 at the other end 40. The signal paddles each terminate with visual indicia 42 (GREEN) and 44 (RED). A counterweight 46 and a stop block 48 are secured to the arm 32 on either side of the bumper 22b. The counterweight 46 and stop block 48 prevent lateral movement of the arm 32 within the bumper 22b.

Referring to FIG. 3, the lip plate 20 is in its operative position, the signal paddle 44 is in the upright position while the signal paddle 42 is obscured from view.

Figure 4:
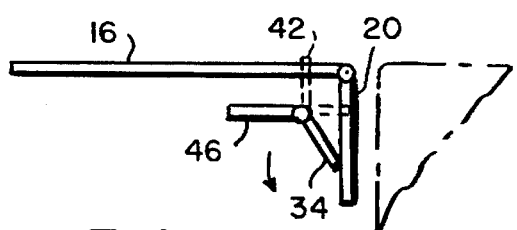
FIGS. 4, 5 and 6 are illustrations of the movement of a dock loader together with its lip plate in combination with the signaling device of the invention.
Figure 6:
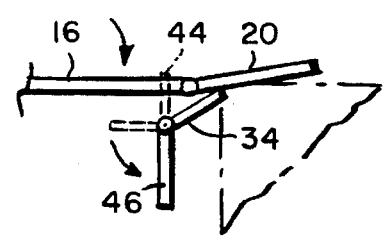

In the operation of the invention, the pit-mounted dock leveler and signaling system are in the position shown in FIGS. 2 and 4. After a trailer has been docked at the loading dock, the pit-mounted dock leveler plates 16 and 20 move upwardly from their inoperative position with the lip plate commencing to extend outwardly, FIG. 5. Subsequently, the plates 16 and 20 move downwardly while the lip plate 20 engages the floor of the trailer, FIG. 6.

Figure 5:
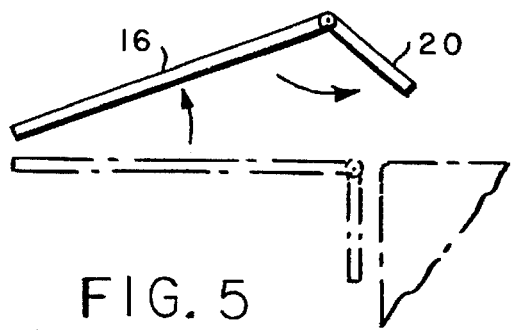

Referring to FIGS. 3, 4 and 5, the counterweight 46 and thereby the signal paddles rotate through a 90° arc. With reference to FIG. 4, the counterweight 46 is at a 9:00 position, the GREEN signal paddle 42 is at a 12:00 position and the RED signal paddle 44 is at a 3:00 position. After the dock leveler has moved to its operative position, the counterweight 46 is at the 6:00 position, the GREEN signal paddle 42 is at the 9:00 position and the RED signal paddle 44 is at the 12:00 position. The arm 34 is not fixedly secured to the underside of the lip plate 20 but simply is biased against the underside of the lip plate and travels along the lip plate as the lip plate moves through its various positions.

The foregoing description has been limited to a specific embodiment of the invention. It will be apparent, however, that variations and modifications can be made to the invention, with the attainment of some or all of the advantages of the invention. Therefore, it is the object of the appended claims to cover all such variations and modifications as come within the true spirit and scope of the invention.

Having described my invention, what I now claim is:

1. A signaling system connected to a dock loader, the dock loader comprising a base plate attached to a dock and having a leading edge, the dock loader further comprising a lip plate hinged to the leading edge, the lip plate adapted to move from an inoperative position where the lip plate hangs substantially vertically to an operative position where the lip plate is substantially horizontal and engages the floor of a trailer, the signaling system comprising:

an arm rotatably secured to the dock, the arm having one end and another end;

the another end of the arm having secured thereto in spaced apart relationship two signal paddles each of a distinct visual indicia; and means to maintain the one end of the arm biased against the underside of the lip plate wherein when the lip plate is in its inoperative position one of the signal paddles will be in a display position while the other signal paddle is out of the display position and when the lip plate is in its operative position the other signal paddle will be in the display position while the one signal paddle will be out of the display position.

2. The signaling system of claim 1 wherein the one end of the arm is angled with reference to the longitudinal axis of the arm to ensure constant contact with the underside of the lip plate when the lip plate moves between its operative and inoperative positions.

3. The signaling system of claim 2 wherein the dock includes a pair of bumpers extending from a front wall thereof and the arm is rotatably secured through one of said bumpers.

4. The signaling system of claim 3 wherein the means to maintain the one end of the arm biased against the lip plate comprises a counterweight.

5. The signaling system of claim 4 further comprising a stop block, the counterweight and the stop block being on either side of the one bumper to prevent linear movement of the arm with reference to the bumper.

6. The signaling system of claim 5 wherein the signal paddles are spaced apart 90° from each other.

7. The signaling system of claim 6 configured such that when the lip plate is in its inoperative position the one signal paddle is at a 12:00 position with reference to the longitudinal axis of the arm and the counterweight is in a 9:00 position with reference to the longitudinal axis of the arm; and when the lip plate is in its operative position, the other signal paddle is in the 12:00 position with reference to the longitudinal axis of the arm, and the counterweight is in the 6:00 position with reference to the longitudinal axis of the arm.

* * * * *